United States Patent
Fu et al.

(10) Patent No.: US 8,450,236 B2
(45) Date of Patent: May 28, 2013

(54) SUPPORTED PRECIOUS METAL CATALYSTS VIA HYDROTHERMAL DEPOSITION

(75) Inventors: Guoyi Fu, Ellicott City, MD (US); Mark B. Watson, Kensington, MD (US); Charles B. Muehlberger, Baltimore, MD (US)

(73) Assignee: Cristal USA Inc., Hunt Valley, MD (US)

( * ) Notice: Subject to any disclaimer, the term of this patent is extended or adjusted under 35 U.S.C. 154(b) by 116 days.

(21) Appl. No.: 12/759,320

(22) Filed: Apr. 13, 2010

(65) Prior Publication Data

US 2011/0251055 A1    Oct. 13, 2011

(51) Int. Cl.
- *B01J 23/00* (2006.01)
- *B01J 21/00* (2006.01)
- *B01J 20/00* (2006.01)

(52) U.S. Cl.
USPC ........... 502/339; 502/243; 502/262; 502/327; 502/332; 502/333; 502/334; 502/344; 502/347; 502/350; 502/355; 502/415; 502/439; 977/773; 977/775

(58) Field of Classification Search
USPC ............... 502/243, 262, 327, 332, 333, 334, 502/339, 344, 347, 350, 355, 415, 439; 977/773, 977/775
See application file for complete search history.

(56) References Cited

U.S. PATENT DOCUMENTS

| | | | |
|---|---|---|---|
| 4,698,324 A | 10/1987 | Haruta et al. | |
| 4,839,327 A | 6/1989 | Haruta et al. | |
| 5,146,008 A | 9/1992 | Gardano et al. | |
| 6,001,768 A * | 12/1999 | Buysch et al. | 502/230 |
| 6,074,979 A * | 6/2000 | Hagemeyer et al. | 502/159 |
| 6,090,746 A * | 7/2000 | Bonnemann et al. | 502/325 |
| 6,207,128 B1 | 3/2001 | Sellin et al. | |
| 6,603,038 B1 * | 8/2003 | Hagemeyer et al. | 560/241.1 |
| 6,670,301 B2 * | 12/2003 | Adzic et al. | 502/185 |
| 6,958,308 B2 * | 10/2005 | Brown | 502/180 |
| 6,984,607 B2 * | 1/2006 | Kuperman et al. | 502/344 |
| 6,992,039 B2 * | 1/2006 | Jiang et al. | 502/327 |
| 7,045,479 B2 * | 5/2006 | Zhou et al. | 502/125 |
| 7,381,682 B1 * | 6/2008 | Jia et al. | 502/327 |
| 7,381,683 B1 * | 6/2008 | Wang et al. | 502/327 |
| 7,449,423 B2 * | 11/2008 | Zhou et al. | 502/104 |
| 7,514,476 B2 * | 4/2009 | Parasher et al. | 516/78 |
| 7,534,741 B2 * | 5/2009 | Wu et al. | 502/300 |
| 7,541,309 B2 * | 6/2009 | Trevino et al. | 502/325 |

(Continued)

OTHER PUBLICATIONS

Rodriguez, Activation of Gold on Titania: Adsorption and Reaction of SO2 on Au/TiO2(110), J. Am. Chem. Soc., 2002, 124(18), pp. 5242-5250.

(Continued)

*Primary Examiner* — Cam N. Nguyen
(74) *Attorney, Agent, or Firm* — Dunlap Codding, P.C.

(57) ABSTRACT

A process for making a catalyst having precious metal nanoparticles deposited on a support includes first providing an aqueous dispersion of support particles. A pre-treatment slurry is prepared by mixing the aqueous dispersion of support particles with a water-soluble precious metal precursor and a reducing agent. The pre-treatment slurry is hydrothermally treated at a temperature in the range of from about 40° C. to about 220° C. for a time sufficient to deposit precious metal nanoparticles on the surface of the support particles, the precious metal nanoparticles having an average particle size less about 50 nm.

21 Claims, 4 Drawing Sheets

TEM image of an Au/TiO₂ sample calcined at 400°C for 6 hours.

U.S. PATENT DOCUMENTS

| | | | |
|---|---|---|---|
| 7,569,508 B2 * | 8/2009 | Zhou et al. | 502/150 |
| 7,582,586 B2 * | 9/2009 | Fanson et al. | 502/185 |
| 7,601,668 B2 * | 10/2009 | Zhou et al. | 502/325 |
| 7,601,671 B2 * | 10/2009 | LaBarge | 502/326 |
| 7,632,773 B2 * | 12/2009 | Zhou et al. | 502/152 |
| 7,632,775 B2 * | 12/2009 | Zhou et al. | 502/300 |
| 7,645,436 B1 * | 1/2010 | Ryang | 423/511 |
| 7,648,942 B2 * | 1/2010 | Thollon et al. | 502/347 |
| 7,655,137 B2 * | 2/2010 | Zhou et al. | 208/134 |
| 7,659,224 B2 * | 2/2010 | Shimazaki et al. | 502/180 |
| 7,691,772 B2 * | 4/2010 | Saito | 502/159 |
| 7,704,918 B2 * | 4/2010 | Adzic et al. | 502/327 |
| 7,704,919 B2 * | 4/2010 | Adzic et al. | 502/344 |
| 7,709,411 B2 * | 5/2010 | Zhou et al. | 502/300 |
| 7,709,414 B2 * | 5/2010 | Fujdala et al. | 502/326 |
| 7,713,907 B2 * | 5/2010 | Elam et al. | 502/263 |
| 7,718,710 B2 * | 5/2010 | Zhang et al. | 516/97 |
| 7,719,411 B2 * | 5/2010 | Averitt | 340/439 |
| 7,745,367 B2 * | 6/2010 | Fujdala et al. | 502/60 |
| 7,759,281 B2 * | 7/2010 | Kezuka et al. | 502/309 |
| 7,820,583 B2 * | 10/2010 | Fu et al. | 502/209 |
| 7,820,585 B2 * | 10/2010 | Hirata | 502/261 |
| 7,842,641 B2 * | 11/2010 | Fu et al. | 502/242 |
| 7,879,128 B2 * | 2/2011 | El-Shall et al. | 75/10.13 |
| 7,901,656 B2 * | 3/2011 | Winter et al. | 423/592.1 |
| 8,003,707 B2 * | 8/2011 | Holland | 516/78 |
| 8,030,242 B2 * | 10/2011 | Uzio et al. | 502/325 |
| 2005/0119120 A1 | 6/2005 | Iwakuni et al. | |
| 2007/0160899 A1 * | 7/2007 | Atanassova et al. | 429/44 |
| 2007/0219090 A1 | 9/2007 | Bowker et al. | |
| 2008/0070778 A1 | 3/2008 | Castellano et al. | |
| 2008/0096986 A1 * | 4/2008 | Thomazeau et al. | 518/716 |
| 2008/0119353 A1 * | 5/2008 | Jia et al. | 502/303 |
| 2008/0182745 A1 * | 7/2008 | Finkelshtain et al. | 502/101 |
| 2008/0206562 A1 * | 8/2008 | Stucky et al. | 428/403 |
| 2009/0226357 A1 * | 9/2009 | Uzio et al. | 423/437.2 |
| 2009/0298684 A1 * | 12/2009 | Zhou et al. | 502/326 |
| 2009/0325787 A1 | 12/2009 | Fu et al. | |
| 2010/0113832 A1 * | 5/2010 | Ying et al. | 564/473 |
| 2010/0125036 A1 * | 5/2010 | Sharma et al. | 502/330 |

OTHER PUBLICATIONS

PCT/US2011/027113, International Search Report, Oct. 28, 2011.

* cited by examiner

Figure 1. TEM image of an Au/TiO$_2$ sample calcined at 400°C for 6 hours.

Figure 2. XRD pattern of an Au/TiO$_2$ sample calcined at 400°C for 6 hours
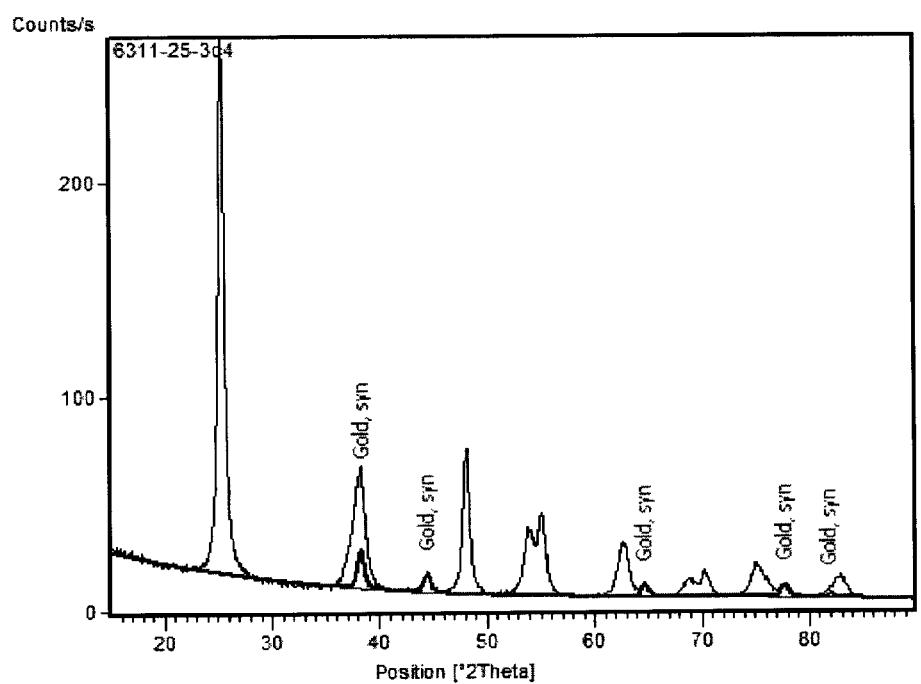

Figure 3. TEM image of a Pt/TiO$_2$ sample calcined at 400°C for 6 hours.
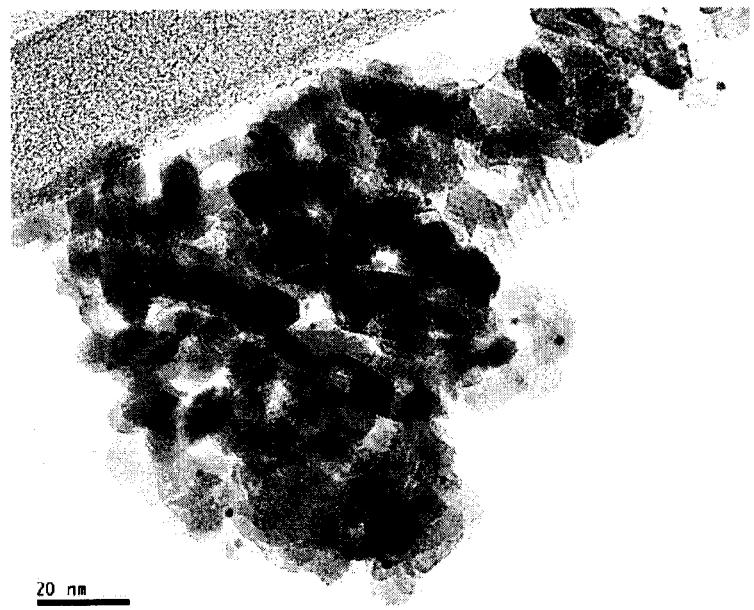

Figure 4. TEM image of an Ag/TiO$_2$ sample calcined at 400°C for 6 hours.

SUPPORTED PRECIOUS METAL CATALYSTS VIA HYDROTHERMAL DEPOSITION

CROSS REFERENCE TO RELATED APPLICATIONS

Not Applicable.

STATEMENT REGARDING FEDERALLY SPONSORED RESEARCH OR DEVELOPMENT

Not applicable.

BACKGROUND

1. Field of Invention

The presently claimed and disclosed inventive concept(s) relates generally to catalysts and methods of making catalysts and, more particularly, but not by way of limitation, to catalysts and methods of making catalysts of precious metal nanoparticles supported on metal oxide particles.

2. Background of the Invention

Precious metal nanoparticles supported on metal oxides can provide active catalysts for a number of reactions of both environmental and industrial importance. For example, Rodriguez, et al. [1] teach that gold nanoparticles deposited on titania are active catalysts for the low-temperature oxidation of carbon monoxide, the selective oxidation of propene, and photocatalytic oxidations used for environmental cleanup.

Supported precious metal catalysts are typically prepared by one of the following process types: a) co-precipitation, b) deposition/precipitation, or c) impregnation processes. Details of these technologies are described in "Preparation of Solid Catalysts" edited by G. Ertl, et al., Wiley-VCH, 1999; chapter 4, pp. 315-388. In co-precipitation processes, soluble precursors of both the support and the precious metal are precipitated from solution together (e.g., by adjusting the pH) followed by drying, calcination, and reduction of the precious metal precipitate to metallic form. Deposition-precipitation methods involve precipitation (e.g., by adjusting pH) of a salt or hydroxide of the precious metal in the presence of a suspension of the support, followed by drying, calcination and reduction, typically high-temperature gaseous reduction, to form metallic particles. The final preparation process type, impregnation, is achieved by wetting dry support particles with a solution of a solublized precious metal such that the precious metal solution impregnates the pores of the support. Following impregnation, the support is dried, causing the precious metal salt to precipitate in the pores. The support is then calcined and exposed to a reducing gas to form metallic particles within the pores.

Gold was considered to have relatively low catalytic activity until recently, when a Japanese professor Masatake Haruta reported highly active gold catalysts [2,3]. Since then, a large number of papers on supported gold catalysts have been published [4-6]. U.S. Pat. No. 4,698,324 describes a deposition-precipitation method for supported gold catalyst production comprising first immersing a support in an aqueous solution of a gold precursor and a precursor of a base such as urea, aging the mixture at an elevated temperature (e.g., 70° C.), and then separating the solid, drying and calcining. It is claimed that since the base for the gold precipitation is generated in situ by decomposing urea, the precipitated gold hydroxide particles have high homogeneity. Similarly, U.S. Pat. No. 4,839,327, by the same inventors as above, further describes improvement of the deposition-precipitation process for supported gold catalyst production. It is reported that strong binding of ultrafine gold hydroxide particles onto the support has been achieved by precipitating gold species under constantly controlled pH (7-11). Also, U.S. Patent Application Publication No. 2007/0219090 discloses an improved incipient wetness impregnation method which involves first impregnating a porous support with a gold solution such as tetrachloroauric acid and a base solution such as sodium carbonate, then washing the material with water or a base solution to remove chlorine species.

Supported platinum catalysts have been widely used for many years. A common method for platinum catalyst production is impregnation, although a number of other techniques have been reported. U.S. Pat. No. 3,210,296 (1965) discloses production of alumina supported platinum catalyst by impregnating an alumina support with a non-aqueous solution of a platinum compound. The method was said to be advantageous for maintaining the surface area of the support material. U.S. Pat. No. 4,370,260 (1983) discloses a method using a one-step impregnation process to deposit multiple platinum group metals including platinum, palladium and rhodium on metal oxide supports such as alumina. The catalyst was for automobile exhaust treatment. More recently, UK patent application 2 443 895 A (2008) disclosed a platinum catalyst supported on bismuth promoted alumina. The method involves impregnating a dry support material with a solvent containing a catalyst metal. A reducing agent is added to form metal particles in the pores of the support, and the supported metal catalyst is then mixed with a bismuth compound forming bismuth promoted supported metal catalyst.

There has also been significant recent interest and research using silver catalysts in $DeNO_x$ applications [7-13]. Silver catalyst preparation is described in U.S. Pat. No. 3,575,888 (1971) disclosing a silver catalyst prepared by aqueous impregnation of porous supports with a solution of reducible silver compound, drying under mild temperature conditions, and treatment of the dried material with a reducing agent in a non-aqueous solvent. U.S. Pat. No. 4,772,578 (1988) discloses a silver deposition method involving first, deposition of a supported metal such as zinc via a vapor phase deposition process, and then treatment of the supported metal material in a solution of a catalyst metal ion species, which deposits on the support via an electrochemical mechanism.

A limitation of the prior art processes is that the particle size and size distribution of the supported precious metal catalyst particles cannot be tightly controlled. Deposition is often within support pores which are not sufficiently exposed to controlled conditions. Also, the deposited species is usually not metallic, and therefore, the particles require secondary treatment to convert to metallic form. Such secondary treatments typically also lower the degree of dispersion and thus, further reduce the effective surface area of the precious metal catalyst particles. The presently claimed and disclosed inventive concept(s) addresses these issues by providing an improved process for making a supported precious metal catalyst.

SUMMARY OF THE INVENTION

The presently claimed and disclosed inventive concept(s) is directed to a process for making a catalyst having precious metal nanoparticles deposited on a support. The process includes the following steps. An aqueous dispersion of support particles is provided. A pre-treatment slurry is prepared by mixing the aqueous dispersion of support particles with a water-soluble precious metal precursor and a reducing agent. The pre-treatment slurry is then treated hydrothermally by subjecting the pre-treatment slurry to a temperature in the range of from about 40° C. to about 220° C. for a time sufficient to deposit precious metal nanoparticles on the surface of the support particles, and the precious metal nanoparticles have an average particle size less about 50 nm.

A method for controlling the particle size and effective surface area of supported catalytic precious metal nanoparticles comprises the following steps. An aqueous dispersion of support particles is provided and a pre-treatment slurry is prepared by mixing the aqueous dispersion of support particles with a water-soluble precious metal precursor and a reducing agent. The pre-treatment slurry is then treated hydrothermally by subjecting the pre-treatment slurry to a predetermined temperature in the range of from about 40° C. to about 220° C. for a time sufficient to deposit precious metal nanoparticles, having a preselected particle size, onto the surface of the support particles. The temperature is determined based on the precious metal and the selected particle size.

Thus, utilizing (1) the technology known in the art; (2) the above-referenced general description of the presently claimed and disclosed inventive concept(s); and (3) the detailed description of the invention that follows, the advantages and novelties of the presently claimed and disclosed inventive concept(s) would be readily apparent to one of ordinary skill in the art.

BRIEF DESCRIPTION OF THE DRAWINGS

FIG. 1 is a TEM image of the catalyst from Example 1, gold nanoparticles (2 wt %) on a titania support, after calcining at 400° C. for six hours.

FIG. 2 is an X-ray diffraction pattern of the catalyst from Example 1, gold nanoparticles (2 wt %) on a titania support, after calcination at 400° C. for six hours. The labeled peaks are from gold and the remaining peaks are from anatase $TiO_2$.

FIG. 3 is a TEM image of the catalyst from Example 2, platinum nanoparticles (1 wt %) on a titania support, after calcining at 400° C. for six hours.

FIG. 4 is a TEM image of the catalyst from Example 3, silver nanoparticles (4 wt %) on a titania support, after calcining at 400° C. for six hours.

DETAILED DESCRIPTION OF THE INVENTION

Before explaining at least one embodiment of the invention in detail, it is to be understood that the invention is not limited in its application to the details of construction, experiments, exemplary data, and/or the arrangement of the components set forth in the following description. The invention is capable of other embodiments or of being practiced or carried out in various ways. Also, it is to be understood that the terminology employed herein is for purpose of description and should not be regarded as limiting.

In the manufacture of catalysts, catalytic performance is generally optimized by maximizing the catalytic component surface area available for reaction, while minimizing the amount, and cost, of the catalytic component used. For a given amount of precious metal catalyst, smaller particle sizes of the precious metal provide greater surface area availability for catalytic reaction. Preferably, the precious metal active components have and retain a very small particle size and are evenly dispersed on the surface of the support. Use of nanoparticle-size precious metal catalyst adhering to and evenly distributed on the surface of a support material helps reduce the total quantity of precious metal required.

The presently claimed and disclosed inventive concept(s) provide a process for making a catalyst having precious metal nanoparticles deposited on a support. The process includes providing an aqueous dispersion of support particles. A pre-treatment slurry is then prepared by mixing the aqueous dispersion of support particles with a water-soluble precious metal precursor and a reducing agent. The pre-treatment slurry is then treated hydrothermally by subjecting the pre-treatment slurry to a temperature in the range of from about 40° C. to about 220° C. for a time sufficient to deposit precious metal nanoparticles on the surface of the support particles. The temperature is selected to provide precious metal nanoparticles having an average particle size less about 50 nm.

The water-soluble precious metal precursor can be present in an aqueous solution prior to mixing with the aqueous dispersion of support particles, or it can be added directly to the aqueous dispersion of support particles. The reducing agent can be mixed with the precious metal precursor aqueous solution, with the aqueous dispersion of support particles, or with the combined mixture of precious metal precursor and support particles.

It is important to note that the process includes providing a highly homogeneous metal deposition mechanism. The precipitation is driven by raising temperature and pressure on an aqueous premixture of support particles and a soluble precious metal precursor. The homogeneous distribution of temperature and pressure throughout the reaction system insures high homogeneity in metal particle size, dispersion and adhesion. This is quite different from the prior art which relies on a chemical precipitation mechanism (co-precipitation and deposition-precipitation) or solvent/water evaporation mechanism (impregnation).

It is also important to note that the precious metal is deposited on the support particles in a reduced metallic form which differs from most prior art procedures which deposit a precious metal salt or hydroxide/oxide. The prior art precious metal salt or hydroxide/oxide precipitates require secondary treatment to convert them to metallic form, and such secondary treatments typically also lower the degree of dispersion of the precious metal particles. We have found that the combination of wetting the support particles to form an aqueous slurry prior to exposing the support particles to the precious metal, and using a reducing agent with hydrothermal treatment to deposit the precious metal in the metallic form onto the surface of the support particles, synergistically provides an optimum and controllable precious metal particle size, distribution, and adhesion onto the surface of the support particles.

Definitions

All terms used herein are intended to have their ordinary meaning unless otherwise provided.

The terms "catalyst support," "support particles," or "support material" are intended to have their standard meaning in the art and refer to particles on the surface of which a catalytic metal or metal oxide component is deposited.

The terms "active metal catalyst" or "active component" refer to the precious metal catalytic component deposited on the surface of the support material.

The terms "catalyst" and "catalytic composition" are intended to have their standard meaning in the art and refer to the combination of the supported catalyst components and the catalyst support particles.

Unless otherwise specified, all reference to percentage (%) herein refers to percent by weight. The term "loading" refers to the loading of a particular component on the total catalytic composition. For example, the loading of gold on a catalyst is the ratio of the gold weight to the total weight of the catalyst, including the support material, the ratio typically stated as a percentage (%).

The term "hydrothermal" refers to treatment conditions in a sealed system involving water as the reaction medium and with temperatures and pressures higher than ambient, and usually significantly higher than ambient.

The term "autogenic pressure" refers to the self-generated pressure of a liquid at a given temperature.

Commercial particulate supported catalysts typically use a titania-based support material. Titania is a preferred metal oxide support, although other metal oxides can be used as the support, non-limiting examples of which include alumina, silica, alumina-silica, zirconia, magnesium oxide, hafnium oxide, lanthanum oxide, and the like. Such support materials and their methods of manufacture and use are known to those skilled in the art.

When particulate titania ($TiO_2$) is used as a support, there is no limitation as to the type of $TiO_2$ used. The titania can include anatase titanium dioxide and/or rutile titanium dioxide. However, anatase products are often considered preferable to rutile products because they perform better in many catalytic applications. Particulate $TiO_2$ supports with small primary particle sizes and high specific surface areas are also preferable for good catalytic performance. Suitable $TiO_2$ support particles are available commercially from Millennium Inorganic Chemicals as, for example, Tiona® G1, Tiona® G5, and DT-51D™ made using the sulfate process. P25™ is another suitable support product. P25™ is a particulate $TiO_2$ made by gas phase reaction and is available commercially from Evonik.

The support particles are dispersed in water prior to introducing the precious metal. If the dispersion of support particles needs to be enhanced, any suitable dispersing agent may be added. For example, one dispersant that is very effective for $TiO_2$ support particles is an acrylate copolymer dispersant, available commercially as Tamol 1124™ and produced by Rohm and Haas. Any common acids such as nitric acid or oxalic acid, and bases such as ammonia solution or sodium hydroxide solution, may be used to adjust the pH of the aqueous dispersion if desired.

The pre-treatment slurry is prepared by mixing the aqueous dispersion of support particles with a water-soluble precious metal precursor and a reducing agent as described previously. Mixing procedures and equipment are well known to those skilled in the art.

The actual noble metal and noble metal precursor used depends on the catalytic application. Non-limiting examples of suitable noble metals deposited on a support using presently claimed and disclosed inventive concept(s) include gold, palladium, platinum and silver. Other chemicals can also be added to the pre-treatment slurry. For example, a large number of fatty acids, both saturated and unsaturated, may be used as metal particle size controlling agents. Suitable particle size controlling agents include, but are not limited to, stearic acid and oleic acid. The pH can also be adjusted as described for the dispersion of support particles.

Hydrothermal treatment time and temperature for precious metal deposition are typically in the range of from about 50° C. to about 220° C. and 2 hours to about 24 hours, depending on the particular precious metal, overall solution chemistry, and the precious metal particle size desired. By controlling the hydrothermal treatment temperature, and to a lesser degree, the hydrothermal treatment time, the particle size of the resulting precious metal nanoparticles is controlled and excellent adherence of the precious metal nanoparticles to the support particles is achieved. In addition, hydrothermal treatment insures deagglomeration of the support particles and a high degree of crystallinity in the deposited precious metal nanoparticles.

Hydrothermal treatment is typically conducted in a closed vessel(s) with autogenic pressures. The treatment process can be batch or continuous and the pre-treatment slurry is heated and mixed using equipment and procedures known to those skilled in the art. In one embodiment, the temperature is controlled to provide precious metal nanoparticles having a mean particle diameter in the range of from about 1 nanometer (nm) to about 100 nm. In another embodiment, the temperature is controlled to provide precious metal nanoparticles having a mean particle diameter in the range of from about 1 nm to about 10 nm.

Soluble precious metal precursors can vary widely. Examples of suitable gold metal precursors include, but are not limited to, sodium tetrachloroaurate, potassium tetrabromoaurate, hydrogen tetronitratoaurate, sodium aurothiomalate, and combinations thereof. In one embodiment, the precious metal precursor is sodium tetrachloroaurate, potassium tetrabromoaurate, or hydrogen tetranitroaurate. Suitable reducing agents for gold precursors also vary widely, and can include ethanol, iso-propanol, butanediol and a large number of higher mono- and di-alcohols. Because gold is relatively easily reduced, preferred reducing agents include ethanol, iso-propanol, butanediol and the like. Hydrothermal treatment temperature for gold metal nanoparticle deposition is typically in the range of from about 50° C. to about 130° C., and can be in the range of from about 60° C. to about 80° C.

Suitable platinum metal precursors include, but are not limited to, hexachloroplatinic acid, sodium tetrachloroplatinate, platinum sulfate and combinations thereof. Suitable reducing agents for gold precursors also vary widely, and can include ethanol, iso-propanol, butanediol and other higher alcohols and di-alcohols. Like gold, because platinum is relatively easily reduced, preferred reducing agents include ethanol, iso-propanol and the like. Hydrothermal treatment temperature for platinum metal nanoparticle deposition is typically in the range of from about 50° C. to about 150° C., and can be in the range of from about 80° C. to about 120° C.

Suitable palladium metal precursors include, but are not limited to, palladium chloride, sodium tetrachloropalladate, palladium sulfate and combinations thereof. Suitable reducing agents for palladium precursors also vary widely, and can include ethanol, iso-propanol, sodium tetrahydridoborate, sodium hypophosphite and the like. Because palladium is more difficult to reduce, preferred reducing agents include sodium tetrahydridoborate and sodium hypophosphite. Hydrothermal treatment temperature for palladium metal nanoparticle deposition is typically in the range of from about 50° C. to about 180° C., and can be in the range of from about 80° C. to about 120° C.

Any soluble silver-containing compound can be used, and suitable silver metal precursors include, but are not limited to, silver nitrate, silver perchlorate, silver sulfate, silver potassium cyanide and combinations thereof. In some embodiments, silver nitrate, silver perchlorate and silver sulfate are desirable due to price and ready availability. Suitable reducing agents for silver precursors also vary widely, and can include ethanol, iso-propanol, sodium tetrahydridoborate and higher alcohols. Because silver is easily reduced, preferred reducing agents include ethanol, iso-propanol and the like. Hydrothermal treatment temperature for silver metal nanoparticle deposition is typically in the range of from about 50° C. to about 200° C., and can be in the range of from about 90° C. to about 130° C.

In order to further illustrate the presently claimed and disclosed inventive concept(s), the following examples are given. However, it is to be understood that the examples are for illustrative purposes only and are not to be construed as limiting the scope of the invention.

Example 1

A 2 wt % gold catalyst on a $TiO_2$ support was prepared by the following procedure. A slurry of Tiona® G1, an ultrafine $TiO_2$ product made out of the so-called "sulfate process" by Millennium Inorganic Chemicals, was neutralized to pH 9 with an ammonia solution and washed thoroughly to remove the sulfate ions in the slurry. A sample of the washed Tiona® G1 containing 24 g $TiO_2$ was then reslurried with 216 g of deionized water to make 10% $TiO_2$ slurry. Separately, 0.97 g of $NaAuCl_4 \cdot 2H_2O$ (0.48 g of gold, Alfa Aesar) was dissolved in 40 g of deionized water, to which was added, in order, 20 g ethanol (Fisher, Reagent Grade) and 7 g stearic acid (99%, Alfa Aesar). The gold solution was stirred for about 15 minutes and was added to the $TiO_2$ slurry prepared above. The $Au/TiO_2$ mixture was stirred for another 15 minutes before transferring into three stainless steel bomb reactors lined with Teflon cups and lids (125 ml, Parr Instruments). The bomb reactors were put in a roller oven and the deposition reaction was carried out at an oven temperature of 60° C. for 12 hours and a rolling speed of 25 rpm. After the hydrothermal treatment, the $Au/TiO_2$ sample was separated by filtration, washed with deionized water and dried at 110° C. over night. A portion of the dried sample was calcined at 400° C. for 6 hours. TEM measurement revealed that gold nanoparticles smaller than 10 nm were deposited on the surface of $TiO_2$ particles. The TEM image is shown in FIG. 1. X-ray diffraction (XRD) measurement further confirm the formation of gold nanoparticles on the $TiO_2$ support (FIG. 2).

Example 2

A 1 wt % platinum catalyst on $TiO_2$ support was prepared by the same procedure as for Example 1, except that 0.57 g of $Na_2PtCl_4 \cdot xH_2O$ (0.24 g of platinum, Alfa Aesor) was used for platinum deposition. The platinum deposition was carried hydrothermally at 80° C. for 18 hours. A TEM image (FIG. 2) of a $Pt/TiO_2$ sample calcined at 400° C. for 6 hours showed that Pt particles having an average particle size smaller than 5 nm were deposited on the surface of $TiO_2$.

Example 3

A 4 wt % silver catalyst on a $TiO_2$ support was prepared by the same process as for Example 1, except that 1.5 g of $AgNO_3$ (0.96 g of Ag, Alfa Aesor) was used for silver deposition. The deposition reaction was carried out under hydrothermal conditions at 90° C. for 18 hours. TEM measurement on a 400° C. calcined $Ag/TiO_2$ sample indicated that silver particles having an average particle size smaller than 5 nm were deposited on the surface of $TiO_2$.

From the above descriptions, it is clear that the presently disclosed and claimed inventive concept(s) are well-adapted to carry out the objects and to attain the advantages mentioned herein, as well as those inherent in the presently disclosed and claimed inventive concept(s). While the presented embodiments have been described for purposes of this disclosure, it will be understood that numerous changes may be made which will readily suggest themselves to those skilled in the art and which are accomplished within the spirit of the presently disclosed and claimed inventive concept(s).

CITED REFERENCES

1. Rodriguez, H., et al., "Activation of Gold on Titania: Adsorption and Reaction of $SO_2$ on $Au/TiO_2$", *J. Am. Chem. Soc.*, 2002, 124 (18), 5242-5250.
2. Haruta, M., et al., "Novel Gold Catalysts for the Oxidation of Carbon Monoxide at a Temperature far below 0° C." *Chem. Lett.*, 1987, 405.
3. Haruta, M., et al., "Low Temperature Oxidation of CO over Gold Supported on TiO2, α-Fe2O3, and Co3O4", *J. Catal.* 1993, 144(1), 175.
4. Bond, G. C. and Thompson, D. T. "Catalysis by Gold", *Catal. Rev.-Sci. Eng.*, 41(3&4), 319-388 (1999).
5. Haruta, M. "Gold as Novel Catalysts in the 21$^{st}$ Century: Preparation, Working Mechanisms and Application", *Gold Bull.*, Vol 37, No. 1 (2004).
6. Hutchings, G. J. and Haruta, M. "A Golden Age of Catalysis: A Perspective", *Appl. Cat. A*, 291, 2-5 (2005).
7. K. Shimizu, et al. Applied Catalysis B: Environmental 25 (2000) 239-247.
8. F. C. Meunier, et al. Applied Catalysis B: Environmental 30 (2001) 163-172.
9. L. E. Lindfors, et al. Topics in Catalysis, 28 (2004) 185-189.
10. R. Burch, et al. Topics in Catalysis, 30/31 (2004) 19-25.
11. F. Klingstedt, et al. Topics in Catalysis, 30/31 (2004) 27-30.
12. K. Arve, et al. Topics in Catalysis, 30/31 (2004) 91-95.
13. K. Eranen, et al. Journal of Catalysis, 227 (2004) 328-343.

What is claimed is:

1. A process for making a catalyst having precious metal nanoparticles deposited on a support, the process comprising the following steps:
    (a) preparing a slurry of an aqueous dispersion of support particles, a water-soluble precious metal precursor, and a reducing agent; and
    (b) hydrothermally treating the slurry in a sealed system by heating the slurry to a temperature in a range of from about 40° C. to about 220° C. at autogenic pressure for a time sufficient to deposit precious metal nanoparticles, in a metallic form, onto at least a portion of a surface of the support particles, the precious metal nanoparticles having an average particle size less than about 50 nm.

2. The process of claim 1, wherein the support particles comprise a particulate metal oxide.

3. The process of claim 2, wherein the particulate metal oxide is particulate titanium dioxide.

4. The process of claim 3, wherein the titanium dioxide is primarily in the anatase form.

5. The process of claim 1, wherein the precious metal precursor is selected from the group consisting of metal precursors of gold, palladium, platinum and silver.

6. The process of claim 1, wherein the precious metal precursor comprises a metallic gold precursor, and wherein the particle size of the resulting metallic gold nanoparticles is controlled, in part, by heating the slurry to a temperature in the range of from about 50° C. to about 130° C. in the step for hydrothermally treating.

7. The process of claim 6, wherein the precious metal precursor is selected from the group consisting of sodium tetrachloroaurate, potassium tetrabromoaurate, hydrogen tetranitroaurate and combinations thereof.

8. The process of claim 6, wherein the reducing agent is selected from the group consisting of ethanol, iso-propanol, butanediol and combinations thereof.

9. The process of claim 1, wherein the precious metal precursor comprises a metallic platinum precursor, and wherein the particle size of the resulting metallic platinum nanoparticles is controlled, in part, by heating the slurry to a temperature in the range of from about 50° C. to about 150° C. in the step for hydrothermally treating.

10. The process of claim 9, wherein the precious metal precursor is selected from the group consisting of hexachloroplatinic acid, sodium tetrachloroplatinate, platinum sulfate and combinations thereof.

11. The process of claim 9, wherein the reducing agent is selected from the group consisting of ethanol, iso-propanol, butanediol and combinations thereof.

12. The process of claim 1, wherein the precious metal precursor comprises a metallic palladium precursor, and wherein the particle size of the resulting metallic palladium nanoparticles is controlled, in part, by heating the slurry to a temperature in the range of from about 50° C. to about 180° C. in the step for hydrothermally treating.

13. The process of claim 12, wherein the precious metal precursor is selected from the group consisting of palladium chloride, sodium tetrachloropalladate, palladium sulfate and combinations thereof.

14. The process of claim 12, wherein the reducing agent is selected from the group consisting of sodium tetrahydridoborate, sodium hypophosphite and combinations thereof.

15. The process of claim 1, wherein the precious metal precursor comprises a metallic silver precursor, and wherein the particle size of the resulting metallic silver nanoparticles is controlled, in part, by heating the slurry to a temperature in the range of from about 50° C. to about 200° C. in the step for hydrothermally treating.

16. The process of claim 15, wherein the precious metal precursor is selected from the group consisting of silver nitrate, silver perchlorate, silver sulfate and combinations thereof.

17. The process of claim 15, wherein the reducing agent is selected from the group consisting of ethanol, iso-propanol and combinations thereof.

18. The process of claim 1, wherein the slurry further comprises a particle size controlling agent selected from the group consisting of stearic acid, oleic acid, linoleic acid and combinations thereof.

19. The process of claim 1, wherein the slurry further comprises a dispersant.

20. The process of claim 1, further comprising the steps of:
    (c) filtering the hydrothermally treated slurry; and
    (d) calcining the filtered support particles having the metallic precious metal nanoparticles deposited thereon.

21. A method for controlling the particle size and effective surface area of supported catalytic precious metal nanoparticles, the method comprising:
    (a) preparing a slurry of an aqueous dispersion of support particles, a water-soluble precious metal precursor, and a reducing agent; and
    (b) hydrothermally treating the slurry in a sealed system by heating the slurry to a predetermined temperature in a range of from about 40° C. to about 220° C. at autogenic pressure for a time sufficient to deposit precious metal nanoparticles, in a metallic form and having a preselected particle size, onto at least a portion of a surface of the support particles, the temperature determined based on the precious metal and the selected particle size.

* * * * *